(12) United States Patent
Wild

(10) Patent No.: US 7,458,361 B2
(45) Date of Patent: Dec. 2, 2008

(54) METHOD FOR OPERATING AN INTERNAL COMBUSTION ENGINE

(75) Inventor: Ernst Wild, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 194 days.

(21) Appl. No.: 11/607,657

(22) Filed: Nov. 30, 2006

(65) Prior Publication Data

US 2007/0144493 A1    Jun. 28, 2007

(30) Foreign Application Priority Data

Dec. 13, 2005  (DE) .................. 10 2005 059 436

(51) Int. Cl.
*F02M 1/00* (2006.01)
*F02M 7/00* (2006.01)

(52) U.S. Cl. .................. 123/434; 123/435; 123/491; 701/103

(58) Field of Classification Search .................. 123/434, 123/435, 673, 491, 179.16; 701/103, 104; 73/118.2

See application file for complete search history.

(56) References Cited

U.S. PATENT DOCUMENTS

| 5,349,932 | A * | 9/1994 | Boverie et al. | 123/399 |
| 5,398,544 | A * | 3/1995 | Lipinski et al. | 73/114.31 |
| 6,112,724 | A * | 9/2000 | Kotwicki et al. | 123/494 |
| 6,155,242 | A * | 12/2000 | Kotwicki et al. | 123/704 |
| 6,325,052 | B1 * | 12/2001 | Mashiki | 123/520 |
| 6,332,456 | B2 * | 12/2001 | Mashiki | 123/520 |
| 2001/0011540 | A1 * | 8/2001 | Mashiki | 123/520 |

* cited by examiner

*Primary Examiner*—John T Kwon
(74) *Attorney, Agent, or Firm*—Kenyon & Kenyon LLP

(57) ABSTRACT

In an internal combustion engine the fuel is injected into an intake manifold. A quantity characterizing the injection quantity is a function of a predicted quantity which characterizes a predicted air charge. A setpoint quantity is used for determining the predicted quantity which characterizes a setpoint air charge.

12 Claims, 2 Drawing Sheets

US 7,458,361 B2

METHOD FOR OPERATING AN INTERNAL COMBUSTION ENGINE

BACKGROUND INFORMATION

In the market, internal combustion engine are known which are used in motor vehicles. In such a case, the setting of the accelerator is interpreted as the driver's desired torque. This is recalculated to a setpoint air charge in the combustion chamber, from which, in turn, a setpoint throttle valve setting is calculated and is set via a controller. Using an intake-manifold pressure sensor or an air mass flow sensor, an actual air charge in the combustion chamber is determined. From this, in turn, the fuel mass that is to be injected is calculated which, in the last analysis, is set via the duration of the opening of a fuel injector assigned to a combustion chamber in such a way that the stoichiometric ratio of air and fuel (14.7:1) in the combustion chamber is maintained as precisely as possible in order to hold down the emission of pollutants.

However, one problem in this context is that, only when an intake valve in the combustion chamber closes, is it finally certain how much air was aspirated into the combustion chamber, that is, how big the actual air charge actually is. But, at this point in time, the injection must already have ended, because a thorough mixing of the air and fuel mixture, which makes good combustion possible, is above all ensured when the injection takes place early, and is even ended already before the intake valve is opened.

Therefore, at the time of the fuel injection, it is required that the actual air charge, which sets in only at a later time, be predicted. This is done in the known method by using a gradient of the pressure in the intake manifold and a predicted setting of the throttle valve. From this is calculated, in several steps, the pressure in the intake manifold at the time of the closing of the intake valve, and from this, in turn, a predicted air charge is calculated.

It is an object of the present invention to improve the precision in the determination of the predicted air charge (or a corresponding quantity, or rather, one that characterizes this quantity), and if possible, to simplify it, in order to save on computing capacity.

SUMMARY OF THE INVENTION

According to the present invention, it was recognized that in the setpoint quantity characterizing the setpoint air charge, exactly that information is hidden which is required for a simple, and nevertheless reliable and precise prediction of the air charge. For, the setpoint quantity is used to bring about a certain actual quantity (that is, an actual air charge). This is usually done via the position controller of the throttle valve. Thus, the setpoint quantity runs ahead of the actual quantity in dynamic operation, and can therefore be used in a simple way for the prediction of the actual quantity. All in all, the method according to the present invention makes use of the fact that it is easier and more precise to generate a signal that runs behind from a signal that runs ahead, by damping and delaying, than the other way around, by making differences in a signal that runs behind to generate a signal that runs ahead.

For this purpose, we illustrate by a suitable model the dependence of the actual quantity on the setpoint quantity, in the case of dynamic operation. With that, precise results are achieved in the prediction of the air charge. One can therefore do without the multiple-step calculation of the intake-manifold pressure known from the related art, and the subsequent recalculation to the predicted air charge. This, in turn, makes possible considerable potential savings in computing capacity.

Good results are achieved, at low expenditure, if a corrected setpoint quantity characterizing the setpoint air charge is used as the predicted quantity. The setpoint quantity characterizing the setpoint air charge is preferably corrected, in this context, in such a way that the predicted quantity agrees, in a steady state, at least approximately, with an actual quantity that characterizes an actual air charge, that is, within a certain and predetermined tolerance range. The present invention thereby combines the information running ahead of the setpoint quantity characterizing the setpoint air charge with the steady-state accuracy of the actual quantity characterizing the actual air charge.

An especially simple model of the connection between setpoint quantity and actual quantity is made possible by the use of a shaping network (filter section) which portrays the dynamic behavior of at least one region of the intake manifold, at least approximately. This region preferably goes from the throttle valve to the intake valve.

However, in order to make possible a precise setting of the fuel/air mixture in the combustion chamber, even in the steady-state operating condition, an actual quantity characterizing an actual air charge, which is ascertained, for instance, based on a signal of a sensor situated in the intake manifold, may additionally be used for the determination of the predicted quantity.

Specifically, this may be implemented, for instance, by applying a factor to the output of the shaping network and using it to form a difference from the actual quantity, which difference is then fed into an integral element which yields the factor. Such a "feedback adjustment" has the result that the factor remains constant only if, for example, the product of actual quantity and factor is equal to the setpoint quantity.

It is also advantageous if the setpoint quantity is fed into a second shaping network whose output is at least indirectly linked to the output of the first shaping network, and thus yields the predicted quantity. By doing this, the setpoint quantity can be adapted even better to the ideal predicted quantity.

The two shaping networks may basically be designed as low-pass filters, which is easy to implement in software technique. However, other filtering characteristics are also conceivable which model the dynamic behavior of the intake manifold.

DETAILED DESCRIPTION

Figure 1:
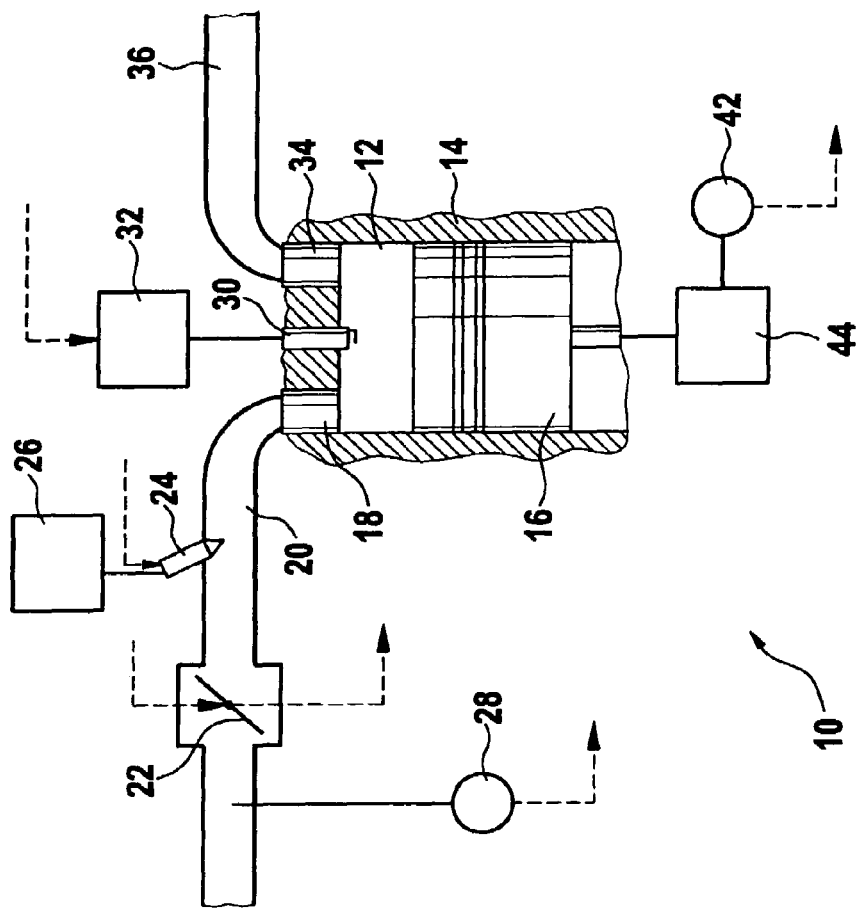
FIG. 1 shows a schematic representation of an internal combustion engine.

In FIG. 1, an internal combustion engine in its entirety bears reference numeral 10. It is used for driving a motor vehicle that is not shown. Internal combustion engine 10 includes a plurality of cylinders, of which only one, having a combustion chamber 12, is shown in FIG. 1. Combustion chamber 12 is bordered by a cylinder housing 14 and a piston 16. Combustion air arrives in combustion chamber 12 via an intake valve 18 and an intake manifold 20.

The air quantity or mass flowing into combustion chamber 12 through intake manifold 20 is influenced by the setting of a throttle valve 22. Between throttle valve 22 and intake valve 18, an injector 24 is situated in intake manifold 20 which is connected to a fuel system 26. It should be pointed out, in this context, that in presently shown internal combustion engine 10, to each cylinder, or rather to each combustion chamber 12, its own injector is assigned in its own intake manifold section. The air mass flowing through intake manifold 20 to combustion chamber 12 is recorded by an air mass flow sensor 28, which may be, for instance, an HFM sensor.

A fuel-air mixture present in combustion chamber 12 is ignited by a spark plug 30, which is connected to an ignition system 32. Hot combustion gases are carried off from combustion chamber 12 via an exhaust valve 34 in an exhaust pipe 36.

The driver of the motor vehicle, that is driven by internal combustion engine 10, expresses a desired torque by activating an accelerator 38. The latter's signals are supplied to a control and regulating device 40, which controls and regulates the operation of internal combustion engine 10. Control and regulating device 40, for instance, generates activation signals for ignition system 32, injector 24 and throttle valve 22. It receives signals, among others, from air mass flow sensor 28 as well as from a rotary speed sensor 42, which records a rotary speed of a crankshaft 44.

In order to hold down emissions in the operation of internal combustion engine 10, the fuel/air mixture located in combustion chamber 12 should be as close to ideal as possible stoichiometrically. This can only be achieved if the fuel mass injected by injector 24 matches as exactly as possible the air mass that is supplied by intake manifold 20 and that is enclosed in combustion chamber 12 after the closing of intake valve 18, or, in other words: The fuel mass to be injected should be established based on the air mass present in combustion chamber 12 after the closing of intake valve 18.

However, one problem, in this context, is that the air mass actually reaching combustion chamber 12 has not been finally established at the point in time of the injection of the fuel by injector 24. This has to do with the fact that the injection of the fuel into intake manifold 20 by injector 24 has ended in many cases before intake valve 18 closes. In order to achieve as thorough a mixing of the injected fuel with the air flowing in intake manifold 20, it is even favorable if the injection has already ended before intake valve 18 opens at all.

Since, at the time of injection of the fuel, the air mass, enclosed in combustion chamber 12 at a later time, cannot be finally known, it has to be "predicted". The determination of the fuel quantity to be injected then takes place based on this predicted air mass.

Figure 2:
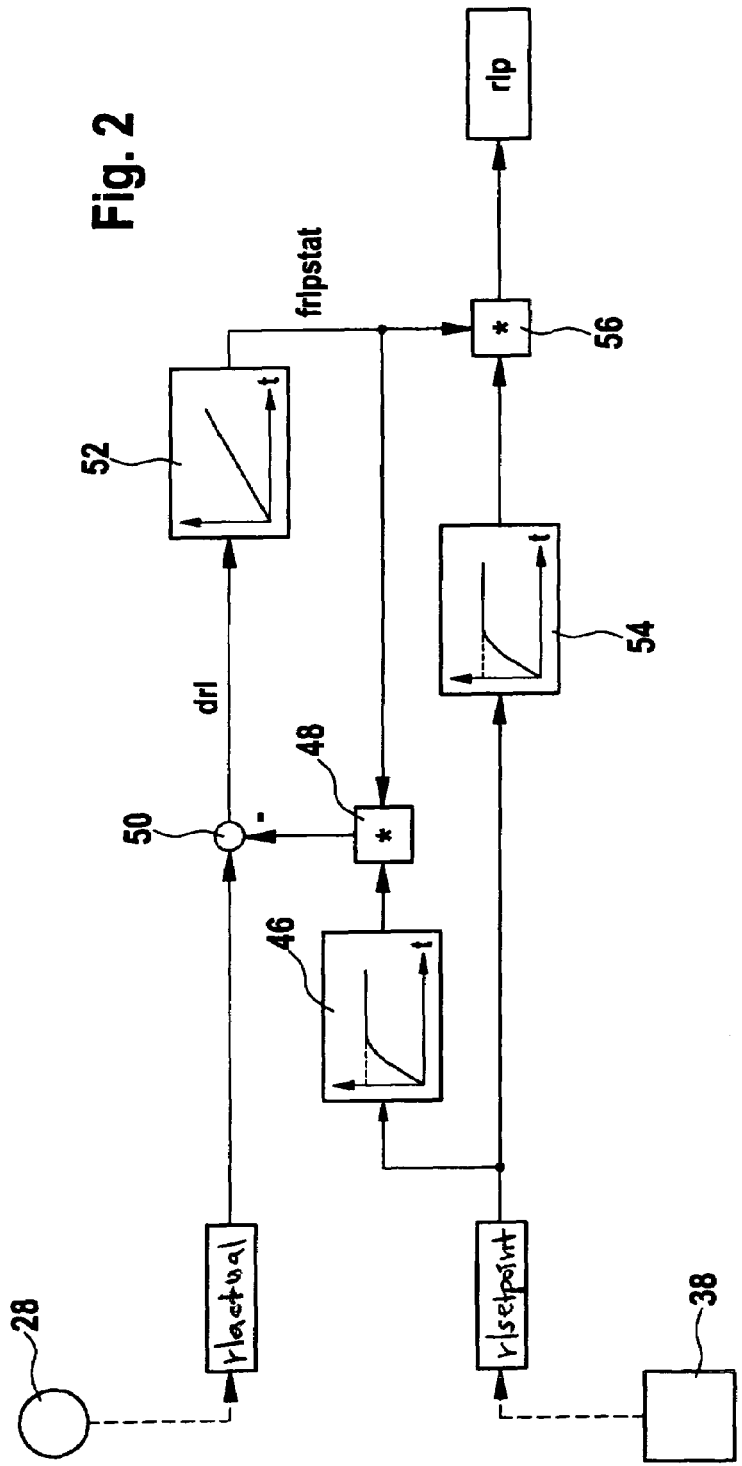
FIG. 2 shows a flow chart of a method for operating the internal combustion engine from FIG. 1.

A method for determining this predicted air mass will now be explained with reference to FIG. 2. Based on the signal of accelerator 38, a setpoint air charge rlsetpoint is determined. With the aid of setpoint air charge rlsetpoint, throttle valve 22 is set. Setpoint air charge rlsetpoint is fed to a first shaping network designed as low-pass filter 46, which at least approximately models the dynamic behavior of the air flow in intake manifold 20 between throttle valve 22 and intake valve 18.

This dynamic response shows itself, for example, in that an adjustment of throttle valve 22 does not lead immediately to a change in the air charge in combustion chamber 12, since the region of intake manifold 20 lying between throttle valve 22 and combustion chamber first has to fill with air and the air present there first has to flow out. The output of low-pass filter 46 is multiplied by a factor frlpstat. In 50, the difference between the result of the multiplication in 48 from an actual air charge rlactual is formed, which, in turn, is based on the signal of air mass flow sensor 28.

The difference drl coming about in 50 is fed to an integral element 52, which generates the factor frlpstat, which is used in 48 for the multiplication. Setpoint air charge rlsetpoint is fed to still a second shaping network designed as low-pass filter 54, the result of which is multiplied in 56 by factor frlpstat. This multiplicative correction yields predicted air charge rlp, which is used for the determination of the fuel mass to be injected by injector 24.

By the use of low-pass filter 46 it is avoided that differences are created, in response to a very dynamic change in setpoint air charge rlsetpoint during the difference formation in 50, to which integrator 52 would react, and which would temporarily corrupt its output, namely factor frlpstat. By the use of factor frlpstat, predicted air charge rlp (=corrected setpoint air charge rlsetpoint) is adjusted to actual air charge rlactual, above all in a steady-state operating condition, in such a way that they agree.

Factor frlpstat is, for example, initialized using 1, and runs to greater values if actual air charge rlactual is greater than setpoint air charge rlsetpoint. It remains constant only if the product, ascertained in 48, of setpoint air charge rlsetpoint and factor frlpstat is equal to actual air charge rlactual. Second low-pass filter 54 makes possible an adjustment of setpoint air charge rlsetpoint in such a way that it corresponds as well as possible to an ideally predicted air charge. Thus, by using this shaping network 54, the dead time (crank angle) is taken into consideration which lies between the calculation of the fuel mass to be injected and the crank angle (closing of intake valve 18) that determines the air charge.

What is claimed is:

1. A method for operating an internal combustion engine, comprising:
   injecting a quantity of fuel into an intake manifold, a quantity characterizing the injection quantity being a function of a predicted quantity, which characterizes a predicted air charge, a setpoint quantity characterizing a setpoint air charge being used for determining the predicted quantity.

2. The method according to claim 1, wherein a corrected setpoint quantity characterizing the setpoint air charge is used as the predicted quantity.

3. The method according to claim 2, further comprising correcting the setpoint quantity characterizing the setpoint air charge in such a way that the predicted quantity agrees in a steady state with an actual quantity characterizing an actual air charge, at least within a tolerance range.

4. The method according to claim 1, further comprising feeding the setpoint quantity characterizing the setpoint air charge to a first shaping network, which portrays a dynamic response of at least one region of the intake manifold, at least within a tolerance range.

5. The method according to claim 4, further comprising ascertaining an actual quantity characterizing an actual air charge with the aid of a signal of a sensor situated in the intake manifold, the actual quantity being used to determine the predicted quantity.

6. The method according to claim 5, wherein an output of the shaping network has a factor applied to it and is then used to form a difference from the actual quantity, characterizing the actual air charge, the difference being fed to an integral element, which yields the factor.

7. The method according to claim 4, further comprising feeding the setpoint quantity characterizing the setpoint air charge to a second shaping network, whose output is linked to an output of the first shaping network at least indirectly, thus producing the predicted quantity.

8. The method according to claim 7, wherein the output of the second shaping network has a factor applied to it, and thus yields the predicted quantity.

9. The method according to claim 7, wherein at least one of the first shaping network and the second shaping network includes a low-pass filter.

10. A computer program embodied in a computer-readable medium containing instructions which when executed by a processor perform the following method for operating an internal combustion engine:
injecting a quantity of fuel into an intake manifold, a quantity characterizing the injection quantity being a function of a predicted quantity, which characterizes a predicted air charge, a setpoint quantity characterizing a setpoint air charge being used for determining the predicted quantity.

11. An electrical storage medium for a control/regulating device of an internal combustion engine, the medium storing a computer program containing instructions which when executed by a processor perform the following method:
injecting a quantity of fuel into an intake manifold, a quantity characterizing the injection quantity being a function of a predicted quantity, which characterizes a predicted air charge, a setpoint quantity characterizing a setpoint air charge being used for determining the predicted quantity.

12. A control/regulating device for an internal combustion engine, comprising:
means for injecting a quantity of fuel into an intake manifold, a quantity characterizing the injection quantity being a function of a predicted quantity, which characterizes a predicted air charge, a setpoint quantity characterizing a setpoint air charge being used for determining the predicted quantity.

* * * * *